(12) United States Patent
Goyal et al.

(10) Patent No.: US 12,386,987 B2
(45) Date of Patent: Aug. 12, 2025

(54) AUTHORIZATION DECISIONS USING CONDITIONED PERMISSIONS FOR RESOURCE COLLECTIONS

(71) Applicant: Dell Products L.P., Round Rock, TX (US)

(72) Inventors: Ruchika Goyal, Cary, NC (US);
Ashfaq Ahmed, Austin, TX (US);
Ameer Jabbar, Lilburn, GA (US);
Xiaojun Yang, Warren, NJ (US);
Ching-Yun Chao, Austin, TX (US);
Wai Yim, Merrimack, NH (US)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/364,939

(22) Filed: Aug. 3, 2023

(65) Prior Publication Data
US 2025/0045430 A1    Feb. 6, 2025

(51) Int. Cl.
*G06F 21/60*   (2013.01)
*G06F 21/62*   (2013.01)

(52) U.S. Cl.
CPC ............ *G06F 21/62* (2013.01); *G06F 21/604* (2013.01); *G06F 21/6209* (2013.01)

(58) Field of Classification Search
CPC ........ G06F 21/60; G06F 21/62; G06F 21/604; G06F 21/6209
See application file for complete search history.

(56) References Cited

U.S. PATENT DOCUMENTS

| | | | |
|---|---|---|---|
| 7,080,058 | B1 | 7/2006 | Upadhyayula et al. |
| 8,626,481 | B1 | 1/2014 | Sundararajan et al. |
| 10,922,423 | B1 * | 2/2021 | Rungta .................. G06F 21/604 |
| 10,944,561 | B1 * | 3/2021 | Cahill .................... H04L 9/3213 |
| 11,023,598 | B2 | 6/2021 | Grand |
| 11,108,780 | B2 | 8/2021 | Cohen |
| 11,379,275 | B2 | 7/2022 | Milliron et al. |

(Continued)

OTHER PUBLICATIONS

Chao, Ching-Yun. "Software Services with Declarative Resource Modeling and Resource Model Patterns" U.S. Appl. No. 18/048,669, filed Oct. 21, 2022, 47 pages.

(Continued)

*Primary Examiner* — Jayesh M Jhaveri
(74) *Attorney, Agent, or Firm* — Amin, Turocy & Watson, LLP

(57) ABSTRACT

A system can receive a request, and identify an attribute-based access control policy comprising a permission policy and a condition policy that is associated with performing an operation with respect to a group of computing resources with a first scope of the operation. The system can determine whether the account satisfies the permission policy for the operation, wherein determining whether the account satisfies the condition policy evaluates to true based on account attributes of the account and resource attributes of the group of computing resources in the first scope of the query operation. The system can, in response to determining that the account satisfies the condition policy, send an indication of the request as constrained by the first scope and a second scope that is based on the condition policy to a service, the service performing the operation to produce a result, and responding to the request with the result.

20 Claims, 10 Drawing Sheets

(56) References Cited

U.S. PATENT DOCUMENTS

| | | | |
|---|---|---|---|
| 2005/0021977 | A1 | 1/2005 | Oberst |
| 2007/0289024 | A1* | 12/2007 | Mohammed .......... H04L 63/101 726/28 |
| 2015/0379061 | A1 | 12/2015 | Paraschivescu |
| 2016/0072814 | A1 | 3/2016 | Martinelli |
| 2018/0349797 | A1 | 12/2018 | Garvey et al. |
| 2021/0084048 | A1 | 3/2021 | Kannan et al. |
| 2023/0086475 | A1 | 3/2023 | Mosko |
| 2023/0401332 | A1* | 12/2023 | Vahidnia ................. G06F 21/31 |
| 2024/0179181 | A1 | 5/2024 | Torlak et al. |
| 2024/0179182 | A1 | 5/2024 | Hicks et al. |
| 2024/0179188 | A1 | 5/2024 | Torlak et al. |
| 2024/0249008 | A1* | 7/2024 | Inokuchi ................. G06F 21/62 |

OTHER PUBLICATIONS

Chao, et al. "Scalable Access Control Mechanism" U.S. Appl. No. 17/932,905, filed Sep. 16, 2022, 51 pages.
Hu, et al. "Guide to Attribute Based Access Control (ABAC) Definition and Considerations" NIST Special Publication 800-162 [https://doi.org/10.6028/NIST.SP.800-162], Jan. 2014, 47 pages.
Ferraiolo, et al., "Extensible Access Control Markup Language (XACML) and Next Generation Access Control (NGAC)," ABAC '16: Proceedings of the 2016 ACM International Workshop on Attribute Based Access Control, Mar. 2016, 12 pages.
Ferraiolo, et al., "A Comparison of Attribute Based Access Control (ABAC) Standards for Data ServiceApplications" NIST SP 800-178, [http://dx.doi.org/10.6028/NIST.SP.800-178], Oct. 2016, 68 pages.
"Dell EMC OpenManage EnterpriseSupportAssist Version 1.1" [https://dl.dell.com/topicspdf/openmanage-enterprise-supportassist_users-guide2_en-us.pdf], Jun. 2021, 65 pages.
"Scopes" [https://auth0.com/docs/get-started/apis/scopes] retrieved Nov. 3, 2023, 4 pages.
"Cortex XDR Pro Administrator Guide" [https://docs.paloaltonetworks.com/content/dam/techdocs/en_US/pdf/cortex/cortex-xdr/cortex-xdr-pro-admin/cortex-xdr-pro-admin.pdf/cortex-xdr-pro-admin.pdf], retreived Nov. 3, 2023, 776 pages.
"Attribute Based Access Control" National Institute of Standards and Technology, [https://www.nccoe.nist.gov/sites/default/files/legacy-files/abac-fact-sheet.pdf], Sep. 2017, 2 pages.
"Hierarchical and recursive queries in SQL" Wikipedia. [https://en.wikipedia.org/wiki/Hierarchical_and_recursive_queries_in_SQL#Common_table_expression], retreived Nov. 30, 2023, 5 pages.
Kivimaki, Petteri. "AWS, Azure, GCP: Resource Hierarchies" [https://levelup.gitconnected.com/aws-azure-gcp-resource-hierarchies-25b829127511] Feb. 9, 2020, 15 pages.
"Hierarchical Data in SQL: The Ultimate Guide" [https://www.databasestar.com/hierarchical-data-sql/] Jun. 2, 2023, 21 pages.
"What are the options for storing hierarchical data in a relational database?" [https://stackoverflow.com/questions/4048151/what-are-the-options-for-storing-hierarchical-data-in-a-relational-database], retrieved Nov. 3, 2023, 11 pages.
Monge, Alvaro. "Database design with UML and SQL, 4th edition" [https://web.csulb.edu/colleges/coe/cecs/dbdesign/dbdesign.php?page=intro.html], retrieved Nov. 3, 2023, 2 pages.
Fang, et al. "Attribute-Based Access Control Using Scoped Roles and Conditioned Permissions Dynamic Policies" U.S. Appl. No. 18/331,770, filed Jun. 8, 2023, 47 pages.
"Jabbar et al. ""Dynamic Visibility and Authorization Policymanagement for a Cloud Service Platform"" U.S. Appl. No. 18/350,149, filed Jul. 11, 2023, 59 pages.".
"ACME Laboratories" [https://www.acme.com/], retrieved Dec. 1, 2023, 2 pages.
"Azure Policy definition structure" [https://learn.microsoft.com/en-us/azure/governance/policy/concepts/definition-structure], Aug. 15, 2023, 34 pages.
"Azure policyRule schema" [https://schema.management.azure.com/schemas/2020-10-01/policyDefinition.json], retrieved Dec. 1, 2023, 2 pages.
"Policy-based control for cloud native environments" Open Policy Agent. [https://www.openpolicyagent.org/], retrieved Dec. 1, 2023, 6 pages.
Sathaye, et al. "Self-Tagging", U.S. Appl. No. 18/627,118, filed Apr. 4, 2024, 43 pages.
Chao, et al. "Policy-Based Tagging Governance for Cloud Resource Lifecycle Management" U.S. Appl. No. 18/639,707, filed Apr. 18, 2024, 47 pages.
Sawal, et al. "Meta-Tagging Based Configuration Transformation for Heterogeneous Systems" U.S. Appl. No. 18/639,737, filed Apr. 18, 2024, 47 pages.
Courcelle, Bruno. "Graph equivalences and decompositions definable in Monadic Second-Order Logic. The case of Circle Graphs" presented at Proc. of ICDM, Jul. 24, 2006, 15 pages.
Thomas, Wolfgang. "Languages, Automata, and Logic" May 1996, In Handbook of Formal Languages, vol. 3: Beyond Words. New York NY: Springer-Verlag, 75 pages.
Office Action mailed Dec. 5, 2023 for U.S. Appl. No. 18/048,669, 27 pages.
Notice of Allowance mailed May 13, 2024 for U.S. Appl. No. 18/048,669, 33 pages.
Dasika, et al. "Data Center Monitoring and Management Operation Including a Data Tag Association Tracking Operation" U.S. Appl. No. 18/374,225, filed Sep. 28, 2023, 66 pages.
Guertin, et al. "Data Center Monitoring and Management Operation Including a Data Tag Management Operation" U.S. Appl. No. 18/241,030, filed Aug. 31, 2023, 73 pages.
Realegeno, et al. "User-Configurable Autotagging Policies" U.S. Appl. No. 18/241,040, filed Aug. 31, 2023, 71 pages.
Earley, et al. "Data Center Monitoring and Management Operation Including a Protected Data Tag Operation" U.S. Appl. No. 18/374,230, filed Sep. 28, 2023, 68 pages.
Sathaye, et al. "System and Methods for Dynamic Tags", U.S. Appl. No. 18/374,231, filed Sep. 28, 2023, 66 pages.
Office Action mailed Apr. 14, 2025 for U.S. Appl. No. 17/932,905, 52 pages.
Notice of Allowance mailed Apr. 10, 2025 for U.S. Appl. No. 18/331,770, 36 pages.
Office Action mailed May 29, 2025 for U.S. Appl. No. 18/627,118, 24 pages.

* cited by examiner

400

┌─────────────────────────────────┐
│ AUTHORIZED DECISIONS USING      │
│ CONDITIONED PERMISSIONS FOR     │
│ RESOURCE COLLECTIONS            │
│ COMPONENT 410                   │
└─────────────────────────────────┘

CONSTRAINTS
TABLE 402

| CONSTRAIN ID 404 | CONDITION 406 | QUERY CONSTRAINT 408 |
|---|---|---|
| 1 | MATCH_ACCOUNT_OWNER | ACCOUNT_OWNER={{USER_ID}} |
| 2 | MATCH_BANKER | TRUE={{VALUE}} |
| 3 | MATCH_ON_BANK_NETWORK | TRUE={{VALUE}} |

```
AUTHORIZED DECISIONS USING
CONDITIONED PERMISSIONS FOR
RESOURCE COLLECTIONS
COMPONENT 510
```

CONSTRAINED QUERY TABLE 502

| CONSTRAIN ID 504 | CONDITION 506 | QUERY CONSTRAINT 508 |
|---|---|---|
| 1 | MATCH_USER | USERID=<USER_ID> |
| 2 | MATCH_ORGANIZATION | ORGID=<ORG_ID> |

RECEIVING A REQUEST ASSOCIATED WITH AN ACCOUNT TO PERFORM AN QUERY OPERATION WITH RESPECT TO A GROUP OF COMPUTING RESOURCES, AND A FIRST SCOPE OF THE QUERY OPERATION THAT IDENTIFIES AN AMOUNT OF THE GROUP OF COMPUTING RESOURCES BEING REQUESTED 604

IDENTIFYING AN ATTRIBUTE-BASED ACCESS CONTROL POLICY COMPRISING A PERMISSION POLICY AND A CONDITION POLICY THAT IS ASSOCIATED WITH PERFORMING THE OPERATION WITH RESPECT TO THE GROUP OF COMPUTING RESOURCES WITH THE FIRST SCOPE OF THE OPERATION, WHEREIN THE PERMISSION POLICY COMPRISES A FIRST BOOLEAN EXPRESSION OF ONE OR MORE PERMISSIONS, AND WHEREIN THE CONDITION POLICY COMPRISES A SECOND BOOLEAN EXPRESSION OF ONE OR MORE CONDITIONS 606

DETERMINING WHETHER THE ACCOUNT SATISFIES THE PERMISSION POLICY WITH RESPECT TO THE OPERATION, WHEREIN DETERMINING WHETHER THE ACCOUNT SATISFIES THE CONDITION POLICY EVALUATES TO TRUE BASED ON ACCOUNT ATTRIBUTES OF THE ACCOUNT AND RESOURCE ATTRIBUTES OF THE GROUP OF COMPUTING RESOURCES IN THE FIRST SCOPE OF THE QUERY OPERATION 608

IN RESPONSE TO DETERMINING THAT THE ACCOUNT SATISFIES THE CONDITION POLICY, SENDING AN INDICATION OF THE REQUEST AS CONSTRAINED BY THE FIRST SCOPE AND A SECOND SCOPE THAT IS BASED ON THE CONDITION POLICY TO A SERVICE THAT IS CONFIGURED TO PROCESS THE REQUEST, THE SERVICE PERFORMING THE OPERATION AS CONSTRAINED BY THE FIRST SCOPE AND THE SECOND SCOPE WITH RESPECT TO THE GROUP OF COMPUTING RESOURCES TO PRODUCE A RESULT, AND RESPONDING TO THE REQUEST WITH THE RESULT 610

IN RESPONSE TO RECEIVING A REQUEST ASSOCIATED WITH AN ACCOUNT TO PERFORM AN QUERY OPERATION WITH RESPECT TO A GROUP OF COMPUTING RESOURCES, AND A FIRST SCOPE OF THE QUERY OPERATION THAT IDENTIFIES AN AMOUNT OF THE GROUP OF COMPUTING RESOURCES BEING REQUESTED, IDENTIFYING, BY A SECURITY INTERCEPTOR OF A SYSTEM COMPRISING A PROCESSOR, AN ATTRIBUTE-BASED ACCESS CONTROL POLICY COMPRISING A PERMISSION POLICY AND A CONDITION POLICY THAT IS ASSOCIATED WITH PERFORMING THE OPERATION WITH RESPECT TO THE GROUP OF COMPUTING RESOURCES WITH THE FIRST SCOPE OF THE OPERATION, WHEREIN THE PERMISSION POLICY COMPRISES A FIRST BOOLEAN EXPRESSION OF ONE OR MORE PERMISSIONS, AND WHEREIN THE CONDITION POLICY COMPRISES A SECOND BOOLEAN EXPRESSION OF ONE OR MORE CONDITIONS 704

DETERMINING, BY THE SECURITY INTERCEPTOR, WHETHER THE ACCOUNT SATISFIES THE PERMISSION POLICY WITH RESPECT TO THE OPERATION, WHEREIN DETERMINING WHETHER THE ACCOUNT SATISFIES THE CONDITION POLICY EVALUATES TO TRUE BASED ON ACCOUNT ATTRIBUTES OF THE ACCOUNT AND RESOURCE ATTRIBUTES OF THE GROUP OF COMPUTING RESOURCES IN THE FIRST SCOPE OF THE QUERY OPERATION 706

IN RESPONSE TO DETERMINING THAT THE ACCOUNT SATISFIES THE CONDITION POLICY, SENDING, BY THE SECURITY INTERCEPTOR, AN INDICATION OF THE REQUEST AS CONSTRAINED BY THE FIRST SCOPE AND A SECOND SCOPE THAT IS BASED ON THE CONDITION POLICY TO A SERVICE THAT IS CONFIGURED TO PROCESS THE REQUEST, THE SERVICE PERFORMING THE OPERATION AS CONSTRAINED BY THE FIRST SCOPE AND THE SECOND SCOPE WITH RESPECT TO THE GROUP OF COMPUTING RESOURCES TO PRODUCE A RESULT, AND RESPONDING TO THE REQUEST WITH THE RESULT 708

↓

IN RESPONSE TO RECEIVING A REQUEST ASSOCIATED WITH AN ACCOUNT TO PERFORM AN QUERY OPERATION WITH RESPECT TO A GROUP OF COMPUTING RESOURCES, AND A FIRST SCOPE OF THE QUERY OPERATION, IDENTIFYING AN ATTRIBUTE-BASED ACCESS CONTROL POLICY COMPRISING A PERMISSION POLICY AND A CONDITION POLICY THAT IS ASSOCIATED WITH PERFORMING THE OPERATION WITH RESPECT TO THE GROUP OF COMPUTING RESOURCES WITH THE FIRST SCOPE OF THE OPERATION 804

↓

DETERMINING WHETHER THE ACCOUNT SATISFIES THE PERMISSION POLICY WITH RESPECT TO THE OPERATION, WHEREIN DETERMINING WHETHER THE ACCOUNT SATISFIES THE CONDITION POLICY EVALUATES TO TRUE BASED ON ACCOUNT ATTRIBUTES OF THE ACCOUNT AND RESOURCE ATTRIBUTES OF THE GROUP OF COMPUTING RESOURCES IN THE FIRST SCOPE OF THE QUERY OPERATION 806

↓

IN RESPONSE TO DETERMINING THAT THE ACCOUNT SATISFIES THE CONDITION POLICY, SENDING AN INDICATION OF THE REQUEST AS CONSTRAINED BY THE FIRST SCOPE AND A SECOND SCOPE THAT IS BASED ON THE CONDITION POLICY TO A SERVICE THAT IS CONFIGURED TO PROCESS THE OPERATION, THE SERVICE PERFORMING THE OPERATION AS CONSTRAINED BY THE FIRST SCOPE AND THE SECOND SCOPE WITH RESPECT TO THE GROUP OF COMPUTING RESOURCES TO PRODUCE A RESULT, AND RESPONDING TO THE REQUEST WITH THE RESULT 808

↓

FIG. 8

AUTHORIZATION DECISIONS USING CONDITIONED PERMISSIONS FOR RESOURCE COLLECTIONS

BACKGROUND

Computer systems can provide access to computer resources. Access to these computer resources can be restricted to authorized user accounts.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can A system can receive a request associated with an account to perform a query operation with respect to a group of computing resources, and a first scope of the query operation that identifies an amount of the group of computing resources being requested. The system can identify an attribute-based access control policy comprising a permission policy and a condition policy that is associated with performing the operation with respect to the group of computing resources with the first scope of the operation, wherein the permission policy comprises a first Boolean expression of one or more permissions, and wherein the condition policy comprises a second Boolean expression of one or more conditions. The system can determine whether the account satisfies the permission policy with respect to the operation, wherein determining whether the account satisfies the condition policy evaluates to true based on account attributes of the account and resource attributes of the group of computing resources in the first scope of the query operation. The system can, in response to determining that the account satisfies the condition policy, send an indication of the request as constrained by the first scope and a second scope that is based on the condition policy to a service that is configured to process the request, the service performing the operation as constrained by the first scope and the second scope with respect to the group of computing resources to produce a result, and responding to the request with the result.

An example method can comprise, in response to receiving a request associated with an account to perform an query operation with respect to a group of computing resources, and a first scope of the query operation that identifies an amount of the group of computing resources being requested, identifying, by a security interceptor of a system comprising a processor, an attribute-based access control policy comprising a permission policy and a condition policy that is associated with performing the operation with respect to the group of computing resources with the first scope of the operation, wherein the permission policy comprises a first Boolean expression of one or more permissions, and wherein the condition policy comprises a second Boolean expression of one or more conditions. The method can further comprise determining, by the security interceptor, whether the account satisfies the permission policy with respect to the operation, wherein determining whether the account satisfies the condition policy evaluates to true based on account attributes of the account and resource attributes of the group of computing resources in the first scope of the query operation. The method can further comprise, in response to determining that the account satisfies the condition policy, sending, by the security interceptor, an indication of the request as constrained by the first scope and a second scope that is based on the condition policy to a service that is configured to process the request, the service performing the operation as constrained by the first scope and the second scope with respect to the group of computing resources to produce a result, and responding to the request with the result.

An example non-transitory computer-readable medium can comprise instructions that, in response to execution, cause a system comprising a processor to perform operations. These operations can comprise, in response to receiving a request associated with an account to perform an query operation with respect to a group of computing resources, and a first scope of the query operation, identifying an attribute-based access control policy comprising a permission policy and a condition policy that is associated with performing the operation with respect to the group of computing resources with the first scope of the operation. These operations can further comprise determining whether the account satisfies the permission policy with respect to the operation, wherein determining whether the account satisfies the condition policy evaluates to true based on account attributes of the account and resource attributes of the group of computing resources in the first scope of the query operation. These operations can further comprise, in response to determining that the account satisfies the condition policy, sending an indication of the request as constrained by the first scope and a second scope that is based on the condition policy to a service that is configured to process the operation, the service performing the operation as constrained by the first scope and the second scope with respect to the group of computing resources to produce a result, and responding to the request with the result.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example system architecture for query constraints, and that can facilitate authorization decisions using conditioned permissions for resource collections, in accordance with an embodiment of this disclosure;

FIG. 5 illustrates an example system architecture for a constrained query table, and that can facilitate authorization decisions using conditioned permissions for resource collections, in accordance with an embodiment of this disclosure;

FIG. 6 illustrates an example process flow that can facilitate authorization decisions using conditioned permissions for resource collections in base stations, in accordance with an embodiment of this disclosure;

FIG. 7 illustrates another example process flow that can facilitate authorization decisions using conditioned permissions for resource collections in base stations, in accordance with an embodiment of this disclosure;

FIG. 8 illustrates another example process flow that can facilitate authorization decisions using conditioned permissions for resource collections in base stations, in accordance with an embodiment of this disclosure;

DETAILED DESCRIPTION

Overview

Figure 1:
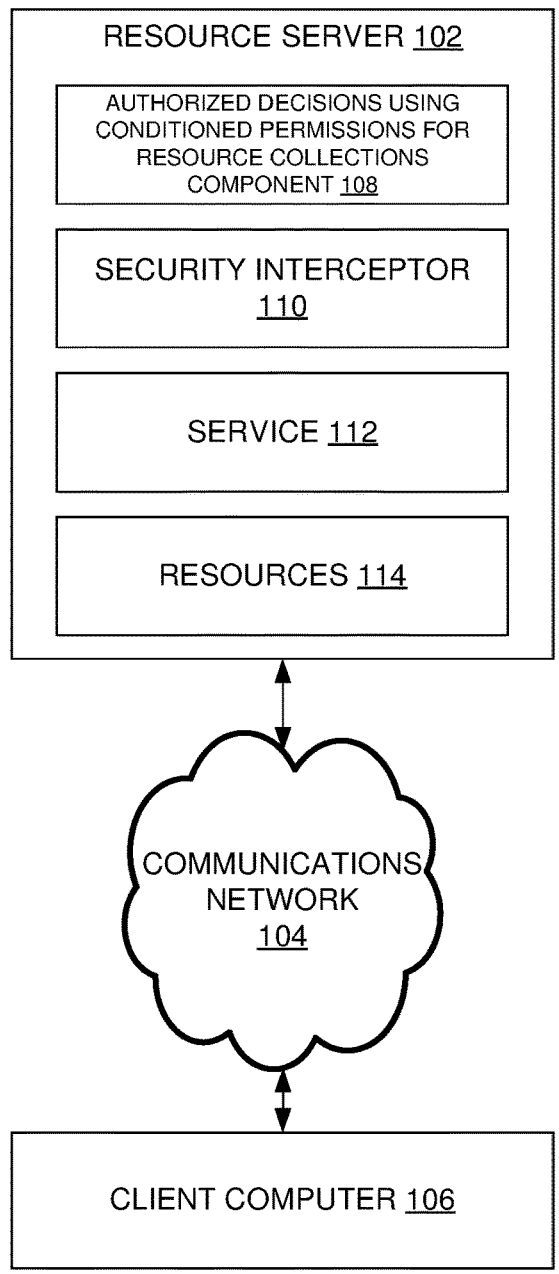
FIG. 1 illustrates an example system architecture that can facilitate authorization decisions using conditioned permissions for resource collections, in accordance with an embodiment of this disclosure.

There can be a desire, from security perspective, to make resource access authorization decision in security code that is developed according to a trusted computing code discipline, and not in application code. For example, the authorization decision on a request to query account (id=3) information via a representational state transfer (REST) application programming interface (API), e.g., GET https://www.acme.com/accounts/3, can be made in a security interceptor first, and the request can be passed to application code to serve the request if and only if the requester has the required permissions.

It can also be desirable to specify an authorization requirement by access control policy. Specifying in policy instead of through binary code can allow access control requirements to be easily verified compared to implementing access control requirements in binary code.

An example access control policy is as follows:
resources:
    path: GET/accounts/{id}/*
    permission-set:
        permissions: "query-account"
        conditions: "Match_Account_Owner"
        permissions: "query-account"
        conditions: "Match_Banker && Match_On_Bank_Network"

In the example above, when a user invokes "GET/accounts/3," where "3" indicates "id=3", to get account 3 data, the user can need to satisfy one of two alternative access control requirements.

The first requirement can be:
permissions: "query-account"
conditions: "Match_Account_Owner"

The requirement indicates that a user needs to have the query-account permission and needs to satisfy the Match_Account_Owner condition.

Match_Account_Owner can comprise a function that evaluates whether the user owns the specified account 3.

If the user does not satisfy the first access control requirement, the security interceptor can evaluate whether the user meet the alternative access control requirement:
permissions: "query-account"
conditions: "Match_Banker && Match_On_Bank_Network"

The alternative requirement can indicate that a user needs to have the query-account permission and needs to satisfy both the Match_Banker condition and the Match_On_Bank_Network condition. Match_Banker can comprise a function that evaluates whether the user is an employee of the bank in question. Match_On_Bank_Network can evaluate whether the user logged in through the bank network (e.g., Bank VPN), and not through external internet.

That is, by specifying one or more conditioned permissions statements on a resource, e.g., a uniform resource indicator (URI), authorization decision on resource access can be enforced in a trusted security interceptor so that application developers can focus on business code development in their applications.

A problem can be that, when a user needs to access more than a single accounts (e.g., to get a list of accounts), access control decisions can need to be made in both trusted security intercept code as well as in application code. Consider the following example.
resources:
    path: GET/accounts/*
    permission-set:
        permissions: "list-accounts"
        conditions: "Match_Account_Owner"
        permissions: "list-accounts"
        conditions: "Match_Banker && Match_On_Bank_Network"

The above policy can indicate that an authorized customer can list all accounts of the requesting customer, and an authorized banker can list accounts of all bank customers. A problem can exist with the application code, such that it will be unaware whether the code should return a list of the specified customer's accounts or return a list of all customers' accounts. It can be that the application code must evaluate the permissions and the conditions the user satisfied to determine which list of accounts to return. This can defeat a purpose of not needing application code to make access control decisions. Requiring application code to make access control decision in code can complicate access control code correctness and security compliance verification.

The present techniques can be implemented to address this problem.

Additionally, some prior approaches for access control lack the benefits of the present techniques. For example, it can be that resource expression is a policy statement that does not support user intent to describe resource collection scope, as in the present techniques.

An example access control policy according to prior approaches can be:

```
{
    "Version": "2012-10-17",
    "Statement": [
    {
        "Sid": "FirstStatement",
        "Effect": "Allow",
        "Action": ["iam: ChangePassword"], "Resource": "*"
    },
    {
        "Sid": "SecondStatement", "Effect": "Allow",
        "Action": "ListAllMyObjectBuckets", "Resource": "*"
    },
    {
        "Sid": "ThirdStatement",
        "Effect": "Allow",
        "Action": [
```

5
-continued

```
    "List*",
    "Get*"
  ],
  "Resource": [
    "arn:::confidential-data", "arn:::confidential-data/*"
  ],
    "Condition": {"Bool": {"MultiFactorAuthPresent": "true"}}
  }
 ]
}
```

Other prior approaches can establish conventions for resource. Policy definitions can describe resource compliance conditions and the effect to take if a condition is met. A condition can compare a resource property field or a value to a required value. Resource property fields can be accessed by using aliases. Then it can be that an access control policy according to these prior approaches does not support URI pattern with requester intents in a manner that can be implemented with the present techniques.

The present techniques can be implemented to facilitate a conditioned permission policy to support enforcing an access control decision of resource collection query operation in a trusted computing base security interceptor logic, and to free application code from implementing any custom access control logic.

The present techniques can be implemented such that a conditioned permission can enforce a resource collection query REST API entirely based on policy.

Additionally, the present techniques can be implemented such that request intentions can be expressed in a URI; relevant query parameters can be expressed in policy statements; users making requests can arrange query parameters in an arbitrary order; and arbitrary query parameter values can be captured with regular expressions.

Example Architectures

FIG. 1 illustrates an example system architecture 100 that can facilitate authorization decisions using conditioned permissions for resource collections in base stations in accordance with an embodiment of this disclosure.

System architecture 100 comprises resource server 102, communications network 104, and client computer 106. In turn, resource server 102 comprises authorization decisions using conditioned permissions for resource collections component 108, security interceptor 110, service 112, and resources 114.

Figure 10:
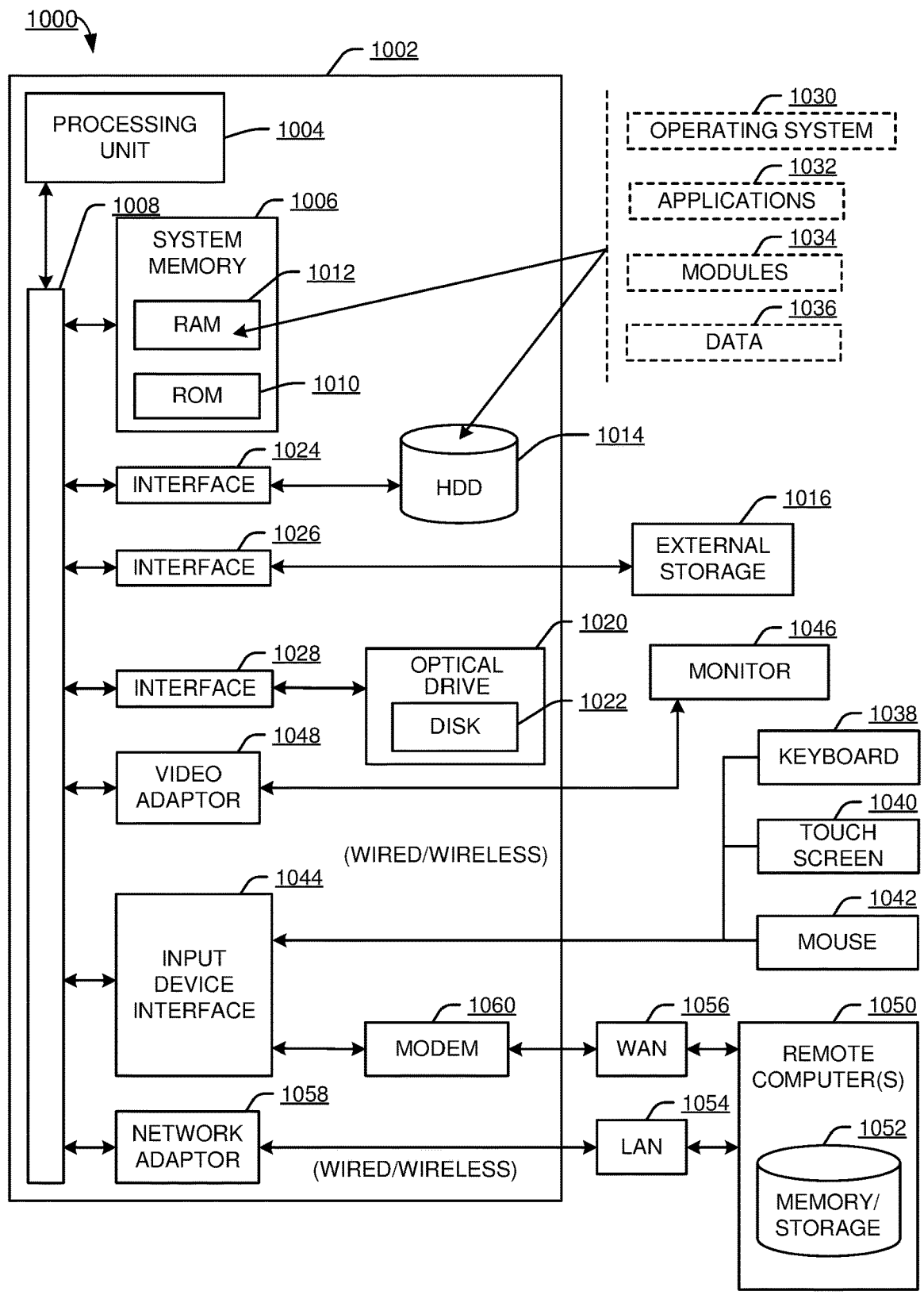
FIG. 10 illustrates an example block diagram of a computer operable to execute an embodiment of this disclosure.

Each of resource server 102 and/or client computer 106 can be implemented with part(s) of computing environment 1000 of FIG. 10. Communications network 104 can comprise a computer communications network, such as the Internet.

Client computer 106 can contact resource server 102 via communications network 104 with a request to access resources 114 as provided by service 112. This can be a request, for example, for information about multiple user accounts.

Security interceptor 110 can intercept this request, and validate it before either rejecting it, or passing it to service 112 to service the request. In this manner, authorization code (in security interceptor 110) can be separated from application code (in service 112), to simplify an application development process. Authorization decisions using conditioned permissions for resource collections component 108 can facilitate this authorization process.

In some examples, authorization decisions using conditioned permissions for resource collections component 108 can implement part(s) of the process flows of FIGS. 6-9 to implement authorization decisions using conditioned permissions for resource collections in base stations.

It can be appreciated that system architecture 100 is one example system architecture for generating and distributing security policies in a containerized environment, and that there can be other system architectures that facilitate generating and distributing security policies in a containerized environment.

Figure 2:
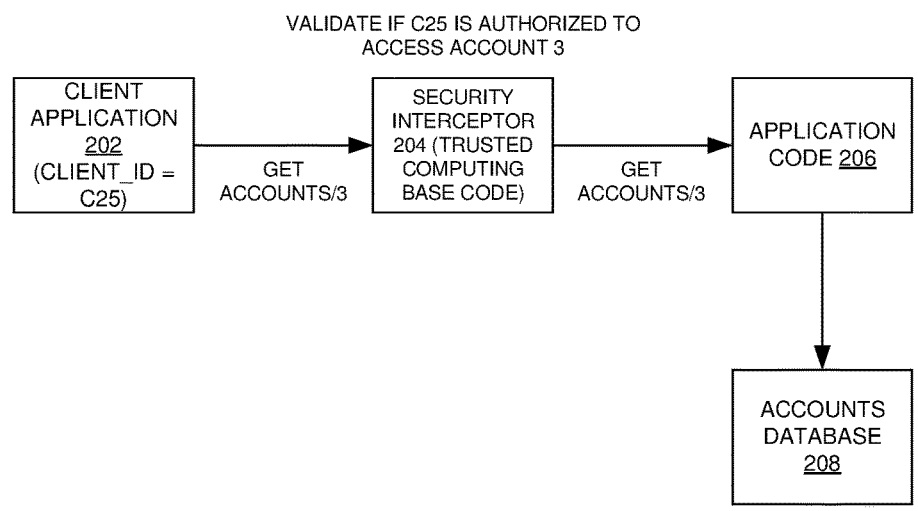
FIG. 2 illustrates another example system architecture that can facilitate authorization decisions using conditioned permissions for resource collections, in accordance with an embodiment of this disclosure.

FIG. 2 illustrates another example system architecture 200 that can facilitate authorization decisions using conditioned permissions for resource collections, in accordance with an embodiment of this disclosure. In some examples, part(s) of system architecture 200 can be used to implement part(s) of system architecture 100 of FIG. 1.

System architecture 200 comprises client application 202, security interceptor 204 (trusted computing base code), application code 206, and accounts database 208.

Relative to prior approaches, the present techniques can be implemented to describe requestor intention, to add a new resource and policy style, and to optimize policy expression.

Regarding describing requester intention, as discussed above, a problem with some prior approaches can be that application code must use access troll policy to determine request intention. That is, does GET/accounts/* indicate listing the customer's accounts, or listing all bank accounts?

The present techniques can be implemented to use a URI query parameter, "all," to allow requesters to specify their intention. GET/accounts?all=false can indicate that a requester wants to get a list of its own accounts. GET/accounts?all=true can indicate that a requester wants to get a list of all bank accounts.

Regarding adding a new resource and policy style, the above URI with query parameter expression can be used in an access control requirement, such as in the following example:
  resources:
    path: GET/accounts?all=false
    permission-set:
      permissions: "list-accounts"
      conditions: "Match_Account_Owner"
    path: GET/accounts?all=true
    permission-set:
      permissions: "list-accounts"
      conditions: "Match_Banker && Match_On_Bank_Network"

Access control policy in the first case, GET/accounts?all=false, can require that a requester has the list-accounts permission to list the requester's own accounts.

Access control policy in the second case, GET/accounts?all=true, can require that a requester must have the list-accounts permission, must be a bank employee, and must login from bank network to list all bank accounts. It can be that this approach can allow access control decision to be enforced using a security interceptor. It can be that the application code can trust the request is already authorized by the security interceptor. It can be that there is no need for application code to perform access control. This can leave no ambiguity to an application developer whether additional custom access control logic needs to be added.

In another example, a user can list its own accounts as a default behavior, such as in this resources:
  path: GET/accounts?all=false
  permission-set:
    permissions: "list-accounts"
    conditions: "Match_Account_Owner"
  path: GET/accounts?all=true permission-set:
   permissions: "list-accounts"
   conditions: "Match_Banker && Match_On_Bank_Network"
path: GET/accounts/*
permission-set:
   permissions: "list-accounts"
   conditions: "Match_Account_Owner"

Figure 3:
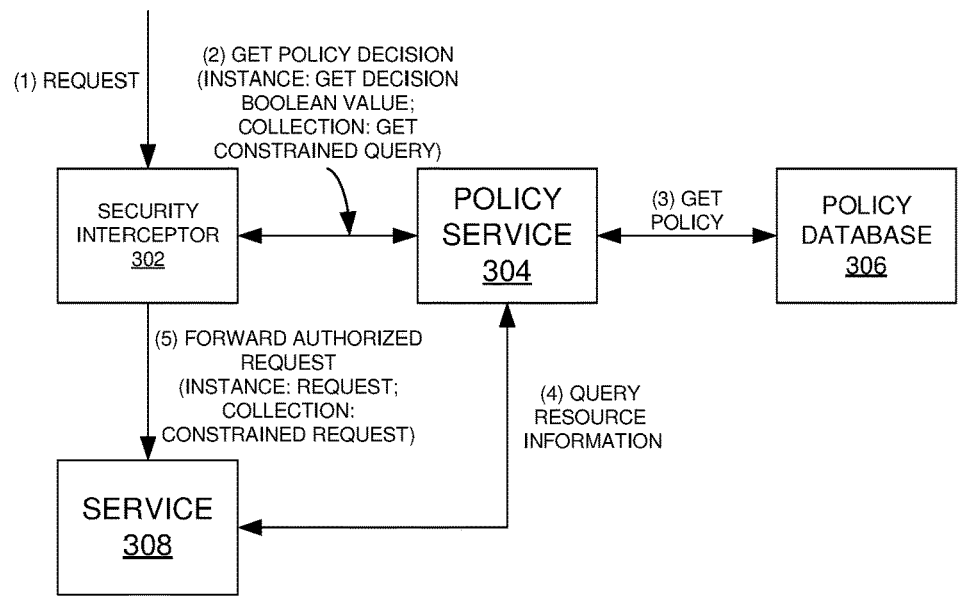
FIG. 3 illustrates an example system architecture for a policy decision and policy enforcement flow, and that can facilitate authorization decisions using conditioned permissions for resource collections, in accordance with an embodiment of this disclosure.

FIG. 3 illustrates an example system architecture 300 for a policy decision and policy enforcement flow, and that can facilitate authorization decisions using conditioned permissions for resource collections, in accordance with an embodiment of this disclosure. In some examples, part(s) of system architecture 300 can be used to implement part(s) of system architecture 100 of FIG. 1.

System architecture 300 comprises security interceptor 302, policy service 304, policy database 306, and service 308.

FIG. 3 depicts policy decision and policy enforcement flow for two cases: a resource instance, and a resource collection. This can illustrate differences between two cases, where policy decision and policy enforcement for a resource collection can be implemented according to the present techniques.

In the resource instance case, for example GET/accounts/{id}, the security interceptor can ask for a policy decision from the policy service and receive a true or false Boolean value back. If the decision is true, the security interceptor can forward the authorized request to the service to process.

In the resource collection case, for example GET/accounts?all=true, the security interceptor can ask the policy service if the request can be authorized, and if so, the policy service can return a constrained request instead of a true/false answer. A reason to return a constrained request can be that the service can simply process the constrained request without adding any custom access control logic. Consider the following example.

resources:
   path: GET/accounts?all=true
   permission-set:
      permissions: "list-accounts"
      conditions: "Match_Account_Owner"

The policy service can first verify if the requester has the required permission list-accounts. If not, the policy service can fail the authorization and return a result, such as in a JavaScript Object Notation format, like:

```
{
  "authorized" = false
}
```

If the requester does have the required list-accounts permission, then the policy service can proceed to generate a constrained request. To do that, the policy service can look up the constraints from a predefined table using the condition as a key as illustrated below.

FIG. 4 illustrates an example system architecture 400 for query constraints, and that can facilitate authorization decisions using conditioned permissions for resource collections, in accordance with an embodiment of this disclosure. In some examples, part(s) of system architecture 400 can be used to implement part(s) of system architecture 100 of FIG. 1.

System architecture 400 comprises constraints table 402 (which comprises constrain id 404, condition 406, and query constraint 408), and authorization decisions using conditioned permissions for resource collections component 410 (which can be similar to authorization decisions using conditioned permissions for resource collections component 108 of FIG. 1). In some examples, part(s) of system architecture 400 can be implemented by part(s) of system architecture 100 of FIG. 1 to facilitate authorization decisions using conditioned permissions for resource collections.

The policy service can return a result that contains a constrained request, like in this example:

```
{
  "authorized" = true,
  "constrained_request_uri"="/accounts?all=true&&account_owner= userId"
}
```

Here, userId is a unique identifier of the requesting user. The policy service can look up the userId from a security context of the requesting user and substitute the user_id with the actual userId.

The security interceptor can forward the constrained request to the service, instead of forwarding the original request.

Consider an example with the following access control policy:

resources:
   path: GET/accounts?all=true
   permission-set:
      permissions: "list-accounts"
      conditions: "Match_Banker && Match_On_Bank_Network"

Both the query constrains have a "true={{value}}" expression. The policy service can evaluate the condition function, substitute the value variable by the condition function return value, and evaluate the query constrain expression. If either expression evaluates to false, the policy service can fail the request (e.g., return a JOSN object with the authorized attribute set to false). Otherwise, the policy service can return a result that contains a constrained request as shown below. The constrained request can be the same as the original request because both query constraints can be evaluated to a Boolean value.

```
{
  "authorized" = true,
  "constrained_request_uri"="/accounts?all=true"
}
```

The security interceptor can forward the constrained request to the service, which can be the same as the original request.

An advantage of this solution can be that a policy decision can be evaluated completely by the policy service. It can be that service code does not need to perform additional access control, and can simply process the constrained requests knowing that the constrained requests are authorized and are formulated to return the right results.

Consider another example. In a case of query resource API access control, GET/rest/v1/resources/{id}, the PDP code can evaluate whether a requesting user has the authorization to retrieve data of the specified resource instance. If authorized, can be request is forward to application code. The application code can know that the request has been authorized and simply proceed to retrieve data of the specified resource instance. Here, policy decision logic is handled by policy engine code and application code does not need to be concerned with access control.

Separating policy code and application code can be implemented resource collection query GET/rest/v1/resources, as follows. Using an API Access Key example, a regular user can retrieve data of all keys owned by the user, and an administrative user can retrieve data of all keys under the organization. Consider an example where an administrative user wants to retrieve all keys owned personally, and does not want to return all keys under the organization. For instance, an administrative user uses a query parameter to specify the exact intent of the query like "GET/rest/v1/api-access-keys?all-org-users-false". An access control policy example for this usage scenario can be as follows:
resources:
  path: GET/rest/v1/api-access-keys
  permission-set:
    permissions: 'List_Access_Keys'
    conditions: 'Match_User && Match_Organization'
  path: GET/rest/v1/api-access-keys?all-org-users=false
  permission-set:
    permissions: 'List_Access_Keys'
    conditions: 'Match_User && Match_Organization'
  path: GET/rest/v1/api-access-keys?all-org-users=true
  permission-set:
    permissions: 'List_Access_Keys && Administrative_User'
  conditions: 'Match_Organization'

The first policy can specify the default access control policy when the requesting user does not indicate whether an intent is to retrieve all organization keys. As a default, it can be assumed that the intent is to retrieve only requesting user's own keys, same as in the second policy.
path: GET/rest/v1/api-access-keys?all-org-users=false
permission-set:
  permissions: 'List_Access_Keys'
  conditions: 'Match_User && Match_Organization'

In both cases, a policy engine can evaluate whether the requesting user has the List_Access_Keys permission. It can be that the two conditions, Match_User and Match_Organization, cannot be resolved because there is no specific resource instance. The objective can be to have the policy engine perform the policy evaluation and not require the service code to perform the policy decision. To satisfy this objective, the policy engine can convert the original request to an authorized and constrained request so that the target service can simply process the constrained request knowing that the request has been authorized and it will result in the right collection.

When a new condition function is registered, a constrained query expression can be registered. The policy engine can use a constrained query table in policy making and to generate a constrained request.

FIG. 5 illustrates an example system architecture 500 for a constrained query table, and that can facilitate authorization decisions using conditioned permissions for resource collections, in accordance with an embodiment of this disclosure. In some examples, part(s) of system architecture 500 can be used to implement part(s) of system architecture 100 of FIG. 1.

System architecture 500 comprises constrained query table 502 (which comprises constrain id 504, condition 506, and query constraint 508) and authorization decisions using conditioned permissions for resource collections component 510 (Which can be similar to authorization decisions using conditioned permissions for resource collections component 108 of FIG. 1). In some examples, part(s) of system architecture 500 can be implemented by part(s) of system architecture 100 of FIG. 1 to facilitate authorization decisions using conditioned permissions for resource collections.

Consider an example where the requesting user id is 10, and the associated organization id in the security context is 12. Then the policy engine can generate a constrained request URI as shown below:
/rest/v1/api-access-keys?all-org-users=false&userId=10&orgId=12

If the requesting user does not have the required List_Access_Keys permission, the policy engine can return a JSON object with the policy decision as follows:
{"authorization": false}

Otherwise, the policy engine can return a JSON object containing both the authorization decision and a constrained request URI as follows:

```
{
    "authorization": true,
    "constrained_request_uri":"/rest/v1/api-access-keys?all-org-users=false&userId=10&orgId=12"
}
```

The third policy can be for an administrative user to list keys of all users of an organization.
path: GET/rest/v1/api-access-keys?all-org-users=true
permission-set:
  permissions: 'List_Access_Keys && Administrative_User'
  conditions: 'Match_Organization'

A policy engine can evaluate whether the requesting user has both "List_Access_Keys" permission and the Administrative_User permission. If so, the policy engine can generate a constrained request URI corresponding to the Match_Organization condition.

Optimizing policy expression according to the present techniques can be implemented as follows. In some examples, there can be two optimization approaches to simplify policy expression definition and enforcement logic.

One optimization approach to simplify policy expression definition and enforcement logic can be to exclude non-policy-relevant query parameters. Consider an example where a customer has different accounts in different regions, e.g., USA, EU, and Mexico. In this example, the customer wants to list accounts in USA region.
GET/accounts?all=false&regions=USA The regions query parameter, regions ("regions=USA"), does not change the authorization requirement on whether a user is a customer or a banker on the bank network. Therefore, it can be that there is no need to list the query parameter in the access control policy. The policy can remain the same as listed below:
resources:
  path: GET/accounts?all=false
  permission-set:
    permissions: "list-accounts"

conditions: "Match_Account_Owner"
path: GET/accounts?all=true
permission-set:
  permissions: "list-accounts"
  conditions: "Match_Banker && Match_On_Bank_Network"

A requestor URI can be either of these two:
GET/accounts?all=false&regions=USA
GET/accounts?regions=USA&all=false The security interceptor can filter out query parameters that are irrelevant to an authorization decision before making the authorization decision, and use the trimmed URI to look up policy requirements.

One optimization approach to simplify policy expression definition and enforcement logic can be to support query parameter permutations and wildcards. Using the bank example, suppose the bank further restricts bank employee to looking up customer bank accounts only when an employee provides a dynamically assigned secure code (e.g., code=12341234). A corresponding policy statement can be as follows:
resources:
  path: GET/accounts?all=false
  permission-set:
    permissions: "list-accounts"
    conditions: "Match_Account_Owner"
  path: GET/accounts?all=true&code=*
  permission-set:
    permissions: "list-accounts"
    conditions: "Match Banker && Match_On_Bank_Network &&
    Match_Secure_Code"

A new condition Match_Secure_Code can evaluate if the provided secure code matches the expected secure code. While "*" is used in URI pattern expression as an example, it can be appreciated that regular expressions can generally be sued.

Consider an example where the bank employee requests to list accounts using GET/accounts?code=12341234&regions=USA&all=false.

A security interceptor can
  filter out the region parameter, then
  determine whether secure code 12341234 fits the wildcards pattern, then
  permute the two policy relevant query parameters.

Example Process Flows

FIG. 6 illustrates an example process flow 600 that can facilitate authorization decisions using conditioned permissions for resource collections in base stations, in accordance with an embodiment of this disclosure. In some examples, one or more embodiments of process flow 600 can be implemented by authorization decisions using conditioned permissions for resource collections component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, and/or process flow 900 of FIG. 9.

Process flow 600 begins with 602, and moves to operation 604.

Operation 604 depicts receiving a request associated with an account to perform a query operation with respect to a group of computing resources, and a first scope of the query operation that identifies an amount of the group of computing resources being requested. This can comprise resource server 102 of FIG. 1 receiving a request from client computer 106, where the request is of the form "GET/accounts?all=false", and where "all=false" (or "all=true") identifies the scope of the operation.

In some examples, the request comprises a uniform resource locator, and a parameter of the uniform resource locator indicates the first scope of the operation. That is, a uniform resource locator (URL) or URI query parameter can permit a requestor to specify its intention. This can be "all=false" in the request "GET/accounts?all=false".

In some examples, the operation corresponds to a group of attribute-based access control policies that comprise the attribute-based access control policy, and the first scope of the operation identifies the attribute-based access control policy from among the group of attribute-based access control policies. That is, the policy can have an entry "-path: GET/accounts?all=false . . . " that identifies an access control policy to be used with the identified first scope.

In some examples, the group of computing resources corresponds to a specified resource type.

After operation 604, process flow 600 moves to operation 606.

Operation 606 depicts identifying an attribute-based access control policy comprising a permission policy and a condition policy that is associated with performing the operation with respect to the group of computing resources with the first scope of the operation, wherein the permission policy comprises a first Boolean expression of one or more permissions, and wherein the condition policy comprises a second Boolean expression of one or more conditions.

After operation 606, process flow 600 moves to operation 608. This can comprise a security interceptor like security interceptor 110 of FIG. 1 performing access control on the request.

Operation 608 depicts determining whether the account satisfies the permission policy with respect to the operation, wherein determining whether the account satisfies the condition policy evaluates to true based on account attributes of the account and resource attributes of the group of computing resources in the first scope of the query operation. This can comprise a security interceptor like security interceptor 110 of FIG. 1 continuing to perform (in conjunction with operation 606) access control on the request.

After operation 608, process flow 600 moves to operation 610.

Operation 610 depicts, in response to determining that the account satisfies the condition policy, sending an indication of the request as constrained by the first scope and a second scope that is based on the condition policy to a service that is configured to process the request, the service performing the operation as constrained by the first scope and the second scope with respect to the group of computing resources to produce a result, and responding to the request with the result. That is, where the security interceptor (e.g., security interceptor 110 of FIG. 1) approves the request, the security interceptor can pass a constrained version of the request on to the appropriate service to process the request (e.g., service 112), where that service replies to the requestor.

In some examples, the request is a first request, and a group of attribute-based access control policies comprises the attribute-based access control policy. In such examples, operation 610 can comprise processing a second request with a default attribute-based access control policy of the group of attribute-based access control policies based on the second request omitting a third scope. In some examples, the account is a first account, the second request is associated with a second account, the second account comprises the first account or a third account, and the default attribute-based access control policy comprises determining whether the second account is authorized to access account information of the second account. That is, listing a user's own account(s) can be a default behavior where a corresponding scope is not identified in a request.

In some examples, operation 610 comprises receiving the request as constrained by the first scope and the second scope from a policy service. This can be similar to security interceptor 302 of FIG. 3 receiving a constrained query from policy service 304.

In some examples, operation 610 comprises forwarding the request as constrained by the first scope and the second scope from the policy service to the service when the request is authorized. This can comprise security interceptor 302 of FIG. 3 forwarding the authorized constrained request to service 308.

In some examples, the receiving of the request as constrained by the first scope and the second scope from the policy service comprises receiving data in a human-readable text format that comprises an attribute-value pair. This can be similar to receiving data in a JSON format.

After operation 610, process flow 600 moves to 612, where process flow 600 ends.

FIG. 7 illustrates an example process flow 700 that can facilitate authorization decisions using conditioned permissions for resource collections in base stations, in accordance with an embodiment of this disclosure. In some examples, one or more embodiments of process flow 700 can be implemented by authorization decisions using conditioned permissions for resource collections component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, and/or process flow 900 of FIG. 9.

Process flow 700 begins with 702, and moves to operation 704.

Operation 704 depicts, in response to receiving a request associated with an account to perform an query operation with respect to a group of computing resources, and a first scope of the query operation that identifies an amount of the group of computing resources being requested, identifying, by a security interceptor of a system comprising a processor, an attribute-based access control policy comprising a permission policy and a condition policy that is associated with performing the operation with respect to the group of computing resources with the first scope of the operation, wherein the permission policy comprises a first Boolean expression of one or more permissions, and wherein the condition policy comprises a second Boolean expression of one or more conditions. In some examples, operation 704 can be implemented in a similar manner as operations 604-606 of FIG. 6.

After operation 704, process flow 700 moves to operation 706.

Operation 706 depicts determining, by the security interceptor, whether the account satisfies the permission policy with respect to the operation, wherein determining whether the account satisfies the condition policy evaluates to true based on account attributes of the account and resource attributes of the group of computing resources in the first scope of the query operation. In some examples, operation 706 can be implemented in a similar manner as operation 608 of FIG. 6.

After operation 706, process flow 700 moves to operation 708.

Operation 708 depicts, in response to determining that the account satisfies the condition policy, sending, by the security interceptor, an indication of the request as constrained by the first scope and a second scope that is based on the condition policy to a service that is configured to process the request, the service performing the operation as constrained by the first scope and the second scope with respect to the group of computing resources to produce a result, and responding to the request with the result. In some examples, operation 708 can be implemented in a similar manner as operation 610 of FIG. 6.

In some examples, the request corresponds to resource collection, operation 708 comprises receiving, by the security interceptor, a constrained request from a policy service that indicates whether the request is authorized, forwarding, by the security interceptor, the constrained request to the service. Using the example of FIG. 3, this can be similar to security interceptor 302 receiving the constrained request from policy service 304, and forwarding the constrained request to service 308.

In some examples, forwarding the constrained request to the service is performed independently of the security interceptor adding control logic to the constrained request. That is, a policy service can return a constrained request so that the service can simply process the constrained request without adding any custom access control logic.

In some examples, operation 708 comprises determining, via the policy service, constraints that correspond to the constrained request comprising accessing a table with a key that comprises a condition of the condition policy. That is, where the requestor does not have a required list accounts permission, then the policy service will proceed to generate a constrained request. To do that, the policy service can look up the constraints from a predefined table using the condition as a key.

In some examples, operation 708 comprises determining, via the policy service, a user identifier that corresponds to the account from a security context of the account, wherein the constrained request identifies the user identifier and omits the account. That is, a request can identify user_id, and userId can be a corresponding unique identifier for a user stored internally. The policy service will look up the userId from security context of the requesting user and substitute the user_id by the actual userId.

After operation 708, process flow 700 moves to 710, where process flow 700 ends.

FIG. 8 illustrates an example process flow 800 that can facilitate authorization decisions using conditioned permissions for resource collections in base stations, in accordance with an embodiment of this disclosure. In some examples, one or more embodiments of process flow 800 can be implemented by authorization decisions using conditioned permissions for resource collections component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, and/or process flow 900 of FIG. 9.

Process flow 800 begins with 802, and moves to operation 804.

Operation 804 depicts, in response to receiving a request associated with an account to perform an query operation with respect to a group of computing resources, and a first scope of the query operation, identifying an attribute-based access control policy comprising a permission policy and a condition policy that is associated with performing the operation with respect to the group of computing resources with the first scope of the operation. In some examples, operation 804 can be implemented in a similar manner as operations 604-606 of FIG. 6.

In some examples, the request comprises a third scope, and operation 804 comprises, in response to determining that the third scope has no effect on an authorization requirement that corresponds to performing the operation, determining whether the account satisfies the attribute-based access control policy independently of the third scope. That is, non-policy-relevant query parameters in a request can be excluded from processing for access determinations.

In some examples, operation 804 comprises removing an indication of the second scope from the request before determining whether the account satisfies the attribute-based access control policy. That is, a security interceptor can filter out query parameters that are irrelevant to authorization decision before making authorization decision and use the trimmed URI to look up policy requirements.

In some examples, the first scope comprises a first query parameter, operation 804 comprises determining that a second query parameter in the request matches a wildcard pattern before determining whether the account satisfies the attribute-based access control policy independently of the second scope. That is, where there is, e.g., a secure code identified in a request, a wildcard (or regular expression) pattern can be used to identify this.

In some examples, the first scope comprises a first query parameter, and operation 804 comprises reordering an order of the first query parameter and a second query parameter in the request before determining whether the account satisfies the attribute-based access control policy independently of the second scope. That is, a permutation of two policy-relevant query parameters in a request can be performed.

In some examples, the request comprises a representational state transfer (REST) request.

After operation 804, process flow 800 moves to operation 806.

Operation 806 depicts determining whether the account satisfies the permission policy with respect to the operation, wherein determining whether the account satisfies the condition policy evaluates to true based on account attributes of the account and resource attributes of the group of computing resources in the first scope of the query operation. In some examples, operation 806 can be implemented in a similar manner as operation 608 of FIG. 6.

After operation 806, process flow 800 moves to operation 808.

Operation 808 depicts, in response to determining that the account satisfies the condition policy, sending an indication of the request as constrained by the first scope and a second scope that is based on the condition policy to a service that is configured to process the operation, the service performing the operation as constrained by the first scope and the second scope with respect to the group of computing resources to produce a result, and responding to the request with the result. In some examples, operation 808 can be implemented in a similar manner to operation 610 of FIG. 6.

After operation 808, process flow 800 moves to 810, where process flow 800 ends.

Figure 9:
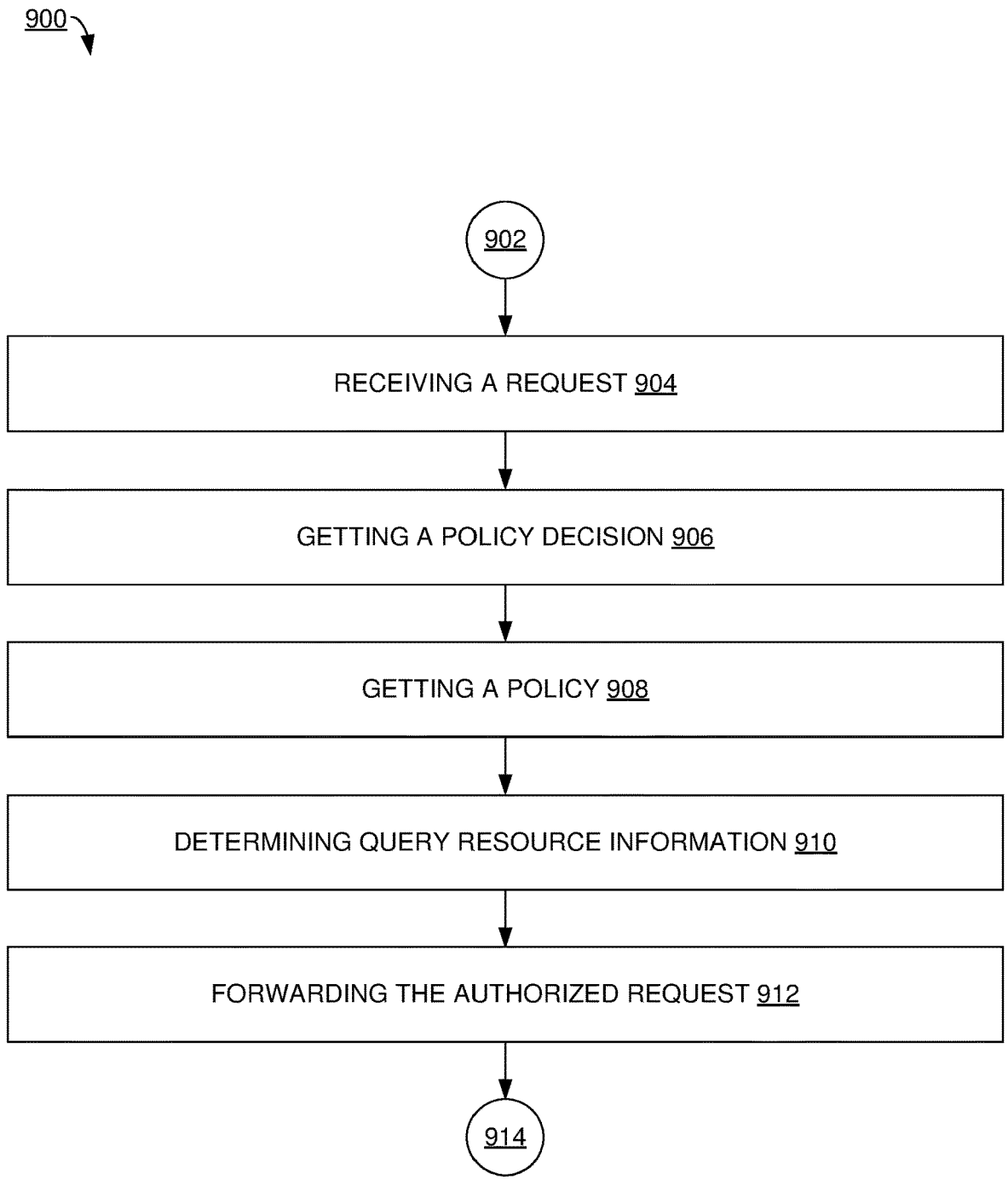
FIG. 9 illustrates an example process flow for policy decision and policy enforcement flow, and that can facilitate authorization decisions using conditioned permissions for resource collections in base stations, in accordance with an embodiment of this disclosure.

FIG. 9 illustrates an example process flow 900 for policy decision and policy enforcement flow, and that can facilitate authorization decisions using conditioned permissions for resource collections in base stations, in accordance with an embodiment of this disclosure. In some examples, one or more embodiments of process flow 900 can be implemented by authorization decisions using conditioned permissions for resource collections component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, and/or process flow 900 of FIG. 9.

Process flow 900 begins with 902, and moves to operation 904.

Operation 904 depicts receiving a request. Using the example of FIG. 3, this can be similar to a request received by security interceptor 302.

After operation 904, process flow 900 moves to operation 906.

Operation 906 depicts getting a policy decision. Using the example of FIG. 3, this can be similar to security interceptor 302 getting a policy decision from policy service 304, where the policy decision comprises a constrained query.

After operation 906, process flow 900 moves to operation 908.

Operation 908 depicts getting a policy. Using the example of FIG. 3, this can be similar to policy service 304 getting a policy from policy database 306.

After operation 908, process flow 900 moves to operation 910.

Operation 910 depicts determining query resource information. Using the example of FIG. 3, this can be similar to policy service 304 performing query request information with service 308.

After operation 910, process flow 900 moves to operation 912.

Operation 912 depicts forwarding the authorized request. Using the example of FIG. 3, this can be similar to security interceptor 302 forwarding a constrained version of the authorized request to service 308.

After operation 912, process flow 900 moves to 914, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of resource server 102 and/or client computer 106 of FIG. 1.

In some examples, computing environment 1000 can implement one or more embodiments of the process flows of FIGS. 6-9 to facilitate authorization decisions using conditioned permissions for resource collections in base stations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database." "cache," and substantially any other information storage component relevant to operation and functionality of a component, refer to "memory components." or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the at least one processor, comprising instructions that, in response to execution by the processor, cause a security interceptor of the system to perform operations, comprising:

receiving a request associated with an account to perform a query operation with respect to a group of computing resources, and a first scope of the query operation that identifies an amount of the group of computing resources being requested;

identifying an attribute-based access control policy comprising a permission policy and a condition policy that is associated with performing the query operation with respect to the group of computing resources with the first scope of the query operation, wherein the permission policy comprises a first Boolean expression of one or more permissions, and wherein the condition policy comprises a second Boolean expression of one or more conditions;

determining whether the account satisfies the permission policy with respect to the query operation, wherein determining whether the account satisfies the condition policy evaluates to true based on account attributes of the account and resource attributes of the group of computing resources in the first scope of the query operation; and in response to determining that the account satisfies the condition policy, sending an indication of the request as constrained by the first scope and a second scope that is based on the condition policy to a service that is configured to process the request, the service performing the query operation as constrained by the first scope and the second scope with respect to the group of computing resources to produce a result, and responding to the request with the result.

2. The system of claim 1, wherein the request comprises a uniform resource locator, and wherein a parameter of the uniform resource locator indicates the first scope of the query operation.

3. The system of claim 1, wherein the query operation corresponds to a group of attribute-based access control policies that comprise the attribute-based access control policy, and wherein the first scope of the query operation identifies the attribute-based access control policy from among the group of attribute-based access control policies.

4. The system of claim 1, wherein the request is a first request, wherein a group of attribute-based access control policies comprises the attribute-based access control policy, and wherein the operations further comprise:

processing a second request with a default attribute-based access control policy of the group of attribute-based access control policies based on the second request omitting a third scope.

5. The system of claim 4, wherein the account is a first account, wherein the second request is associated with a second account, wherein the second account comprises the first account or a third account, and wherein the default attribute-based access control policy comprises determining whether the second account is authorized to access account information of the second account.

6. The system of claim 1, wherein the group of computing resources corresponds to a specified resource type.

7. The system of claim 6, wherein the operations further comprise:

receiving the request as constrained by the first scope and the second scope from a policy service.

8. The system of claim 7, wherein the operations further comprise:

forwarding the request as constrained by the first scope and the second scope from the policy service to the service when the request is authorized.

9. The system of claim 7, wherein the receiving of the request as constrained by the first scope and the second scope from the policy service comprises receiving data in a human-readable text format that comprises an attribute-value pair.

10. A method, comprising:

in response to receiving a request associated with an account to perform a query operation with respect to a group of computing resources, and a first scope of the query operation that identifies an amount of the group of computing resources being requested, identifying, by a security interceptor of a system comprising at least one processor, an attribute-based access control policy comprising a permission policy and a condition policy that is associated with performing the query operation with respect to the group of computing resources with the first scope of the query operation, wherein the permission policy comprises a first Boolean expression of one or more permissions, and wherein the condition policy comprises a second Boolean expression of one or more conditions;

determining, by the security interceptor, whether the account satisfies the permission policy with respect to the query operation, wherein determining whether the account satisfies the condition policy evaluates to true based on account attributes of the account and resource attributes of the group of computing resources in the first scope of the query operation; and in response to determining that the account satisfies the condition policy, sending, by the security interceptor, an indication of the request as constrained by the first scope and a second scope that is based on the condition policy to a service that is configured to process the request, the service performing the query operation as constrained by the first scope and the second scope with respect to the group of computing resources to produce a result, and responding to the request with the result.

11. The method of claim 10, wherein the request corresponds to resource collection, and further comprising:

receiving, by the security interceptor, a constrained request from a policy service that indicates whether the request is authorized; and forwarding, by the security interceptor, the constrained request to the service.

12. The method of claim 11, wherein forwarding the constrained request to the service is performed independently of the security interceptor adding control logic to the constrained request.

13. The method of claim 11, further comprising:

determining, via the policy service, constraints that correspond to the constrained request comprising accessing a table with a key that comprises a condition of the condition policy.

14. The method of claim 11, further comprising:

determining, via the policy service, a user identifier that corresponds to the account from a security context of the account, wherein the constrained request identifies the user identifier and omits the account.

15. A non-transitory computer-readable medium comprising instructions that, in response to execution, cause a system comprising at least one processor to perform operations, comprising:

in response to receiving a request associated with an account to perform a query operation with respect to a group of computing resources, and a first scope of the query operation, identifying an attribute-based access control policy comprising a permission policy and a condition policy that is associated with performing the query operation with respect to the group of computing resources with the first scope of the query operation, wherein the permission policy comprises a first Boolean expression of one or more permissions, and wherein the condition policy comprises a second Boolean expression of one or more conditions;

determining whether the account satisfies the permission policy with respect to the query operation, wherein determining whether the account satisfies the condition policy evaluates to true based on account attributes of the account and resource attributes of the group of computing resources in the first scope of the query operation; and in response to determining that the account satisfies the condition policy, sending an indication of the request as constrained by the first scope and a second scope that is based on the condition policy to a service that is configured to process the query operation, the service performing the query operation as constrained by the first scope and the second scope with respect to the group of computing resources to produce a result, and responding to the request with the result.

16. The non-transitory computer-readable medium of claim 15, wherein the request comprises a third scope, and wherein the operations further comprise:

in response to determining that the third scope has no effect on an authorization requirement that corresponds to performing the query operation, determining whether the account satisfies the attribute-based access control policy independently of the third scope.

17. The non-transitory computer-readable medium of claim 16, wherein the operations further comprise:

removing an indication of the second scope from the request before determining whether the account satisfies the attribute-based access control policy.

18. The non-transitory computer-readable medium of claim 16, wherein the first scope comprises a first query parameter, and wherein the operations further comprise:

determining that a second query parameter in the request matches a wildcard pattern before determining whether the account satisfies the attribute-based access control policy independently of the second scope.

19. The non-transitory computer-readable medium of claim 16, wherein the first scope comprises a first query parameter, and wherein the operations further comprise:

reordering an order of the first query parameter and a second query parameter in the request before determining whether the account satisfies the attribute-based access control policy independently of the second scope.

20. The non-transitory computer-readable medium of claim 15, wherein the request comprises a representational state transfer request.

* * * * *